United States Patent
Gong et al.

(10) Patent No.: US 8,641,402 B2
(45) Date of Patent: Feb. 4, 2014

(54) INJECTION MOLD

(75) Inventors: Wen-Peng Gong, New Taipei (TW);
Xiao-Ping Wu, New Taipei (TW);
Kun-Hsueh Chiang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 335 days.

(21) Appl. No.: 13/229,109

(22) Filed: Sep. 9, 2011

(65) Prior Publication Data

US 2013/0064914 A1    Mar. 14, 2013

(51) Int. Cl.
*B29C 45/26* (2006.01)
*B29C 45/36* (2006.01)

(52) U.S. Cl.
USPC ..... 425/192 R; 425/3; 425/190; 425/DIG. 33

(58) Field of Classification Search
USPC ................. 425/3, 185, 190, 192 R, 542, 577, 425/DIG. 33
See application file for complete search history.

(56) References Cited

U.S. PATENT DOCUMENTS

| | | | | |
|---|---|---|---|---|
| 2,465,276 A | * | 3/1949 | Ryder | 425/3 |
| 4,195,046 A | * | 3/1980 | Kesling | 264/16 |
| 4,544,126 A | * | 10/1985 | Melchert | 249/83 |
| 4,608,744 A | * | 9/1986 | Nemoto | 29/527.1 |
| 5,385,705 A | * | 1/1995 | Malloy et al. | 264/219 |
| 5,612,062 A | * | 3/1997 | Takahashi | 425/3 |
| 5,993,184 A | * | 11/1999 | Morrow | 425/3 |
| 6,019,587 A | * | 2/2000 | Takahashi et al. | 425/3 |
| 6,110,402 A | * | 8/2000 | Miller | 264/31 |
| 6,434,894 B2 | * | 8/2002 | Reymann | 52/127.7 |
| 6,436,327 B1 | * | 8/2002 | Cloutier et al. | 264/248 |
| 6,464,922 B1 | * | 10/2002 | Bogdan | 264/277 |
| 6,923,632 B2 | * | 8/2005 | Koyama et al. | 425/116 |
| 6,942,476 B2 | * | 9/2005 | Parmelee et al. | 425/3 |
| 7,841,059 B2 | * | 11/2010 | Mizuno | 29/428 |
| 2002/0017732 A1 | * | 2/2002 | Koyama et al. | 264/39 |
| 2002/0079611 A1 | * | 6/2002 | Ellison et al. | 264/247 |
| 2002/0185766 A1 | * | 12/2002 | Daihisa et al. | 264/39 |
| 2004/0032053 A1 | * | 2/2004 | Parmelee et al. | 264/236 |
| 2011/0222219 A1 | * | 9/2011 | Bae et al. | 361/679.01 |

* cited by examiner

*Primary Examiner* — Yogendra Gupta
*Assistant Examiner* — Emmanuel S Luk
(74) *Attorney, Agent, or Firm* — WPAT, P.C.; Anthony King

(57) ABSTRACT

An injection mold for molding a first insert element and a second insert element includes a male mold, a female mold matched with the male mold, and at least one fastening assembly. The first insert element includes a first material belt with at least one fastening hole formed therein, and a plurality of first conductive terminals. The second insert element includes a plurality of second conductive terminals. The male mold defines a male cavity for receiving the second conductive terminals therein. The female mold defines a female cavity for receiving the first conductive terminals therein. The fastening assembly includes a fastening element and a magnetic element with a center hole formed therein. The magnetic element is held in the female mold. A top of the fastening element passes through the fastening hole to be inserted in the center hole and attracted by the magnetic element.

12 Claims, 6 Drawing Sheets

INJECTION MOLD

BACKGROUND OF THE INVENTION

1. Field of the Invention

The present invention generally relates to an injection mold, and more particularly to an injection mold capable of locating an insert element therein firmly.

2. The Related Art

Generally, a conventional injection mold for molding a first insert element and a second insert element therein includes a male mold and a female mold. In a process of molding, the second insert element is mounted in a male cavity of the male mold and the first insert element is mounted in a female cavity of the female mold, then inject plastics into the injection mold to mold a product. However, it's inconvenient to put the first insert element in the female cavity of the female mold because of the female mold being disposed over the male mold and facing to the male mold in an injection machine. Moreover, the first insert element mounted in the female cavity of the female mold is apt to fall off when the female mold is mounted on the male mold. As a result, the male cavity of the male mold will be damaged to affect appearance and function of the product that makes defective rate of the product risen and manufacturing efficiency of the product lowered. Accordingly, manufacturing cost of the product is increased.

SUMMARY OF THE INVENTION

An object of the present invention is to provide an injection mold for molding a first insert element and a second insert element therein. The first insert element includes a first material belt with at least one fastening hole formed therein, and a plurality of first conductive terminals extending from a side of the first material belt. The second insert element including a second material belt and a plurality of second conductive terminals extending from a side of the second material belt. The injection mold includes a male mold, a female mold matched with the male mold, and at least one fastening assembly. A top of the male mold defines a male cavity for receiving the second conductive terminals therein. A bottom of the female mold defines a female cavity for receiving the first conductive terminals therein. The female mold defines at least one fixing hole vertically penetrating therethrough and located adjacent to the female cavity. The fastening assembly includes a fastening element and a magnetic element with a center hole formed therein. The magnetic element is held in the fixing hole. A top of the fastening element passes through the fastening hole to be inserted in the center hole and attracted by the magnetic element to locate the first insert element between the magnetic element and the fastening element.

Another object of the present invention is to provide an injection mold for molding a first insert element. The first insert element includes a first material belt with at least one fastening hole formed therein, and a plurality of first conductive terminals extending from a side of the first material belt. The injection mold includes a male mold, a female mold and at least one fastening assembly. The female mold is matched with the male mold to define a chamber therebetween for receiving the first conductive terminals therein. The female mold defines at least one fixing hole vertically penetrating therethrough and located adjacent to the chamber. The fastening assembly includes a fastening element and a magnetic element with a center hole formed therein. The magnetic element is held in the fixing hole. A top of the fastening element passes through the fastening hole to be inserted in the center hole and attracted by the magnetic element to locate the first insert element between the magnetic element and the fastening element.

As described above, the top of the fastening element passes through the fastening hole to be inserted in the center hole and attracted by the magnetic element to prevent the first insert element falling off from the female mold when the female mold is reversed or rotated.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
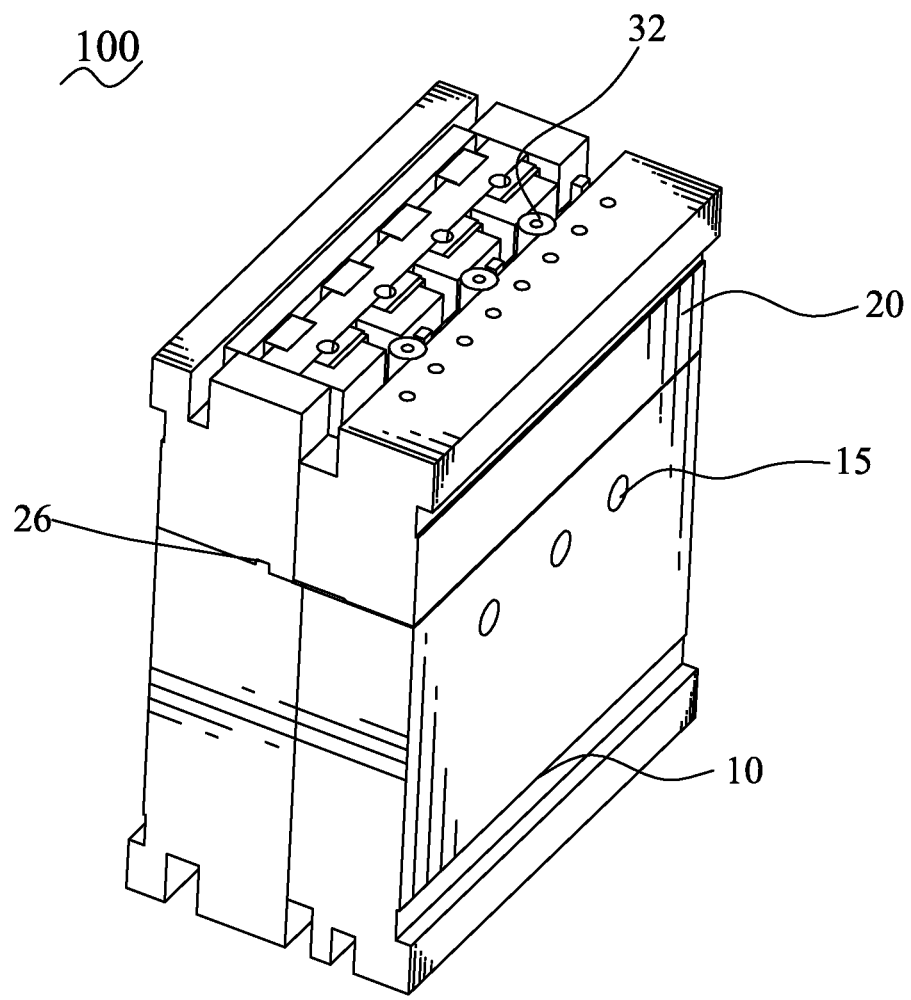
FIG. 1 is a perspective view of an injection mold according to the present invention.

Referring to FIGS. 1-6, an injection mold 100 adapted for molding a first insert element 71 and a second insert element 72 therein includes a male mold 10, a female mold 20, a plurality of fastening assemblies 30, a locating element 40, a plurality of first propping pillars 50 and second propping pillars 60. In this embodiment, the locating element 40 is a steel ball.

Figure 2:
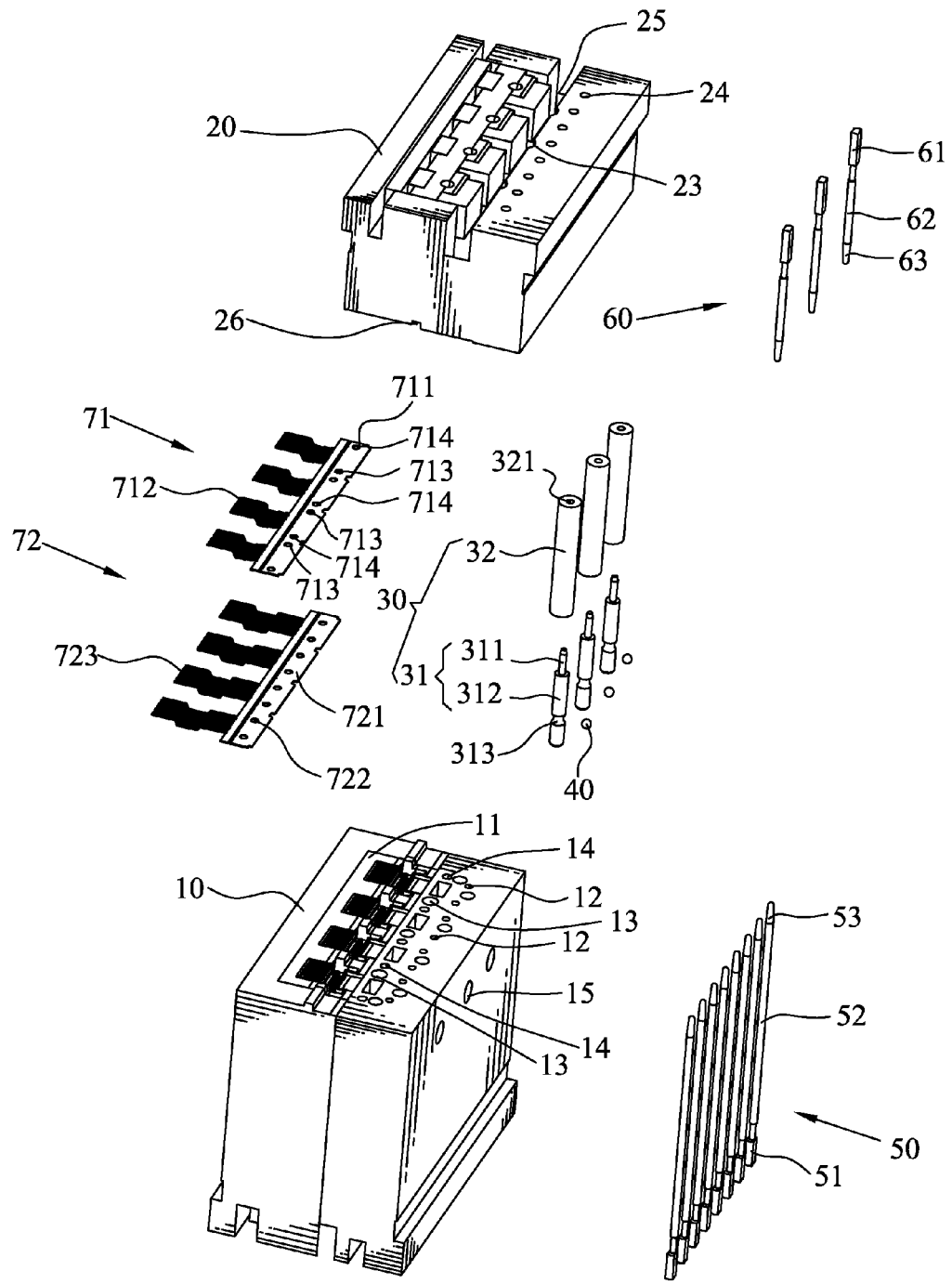
FIG. 2 is an exploded view of the injection mold with a first insert element and a second insert element of FIG. 1.
Figure 3:
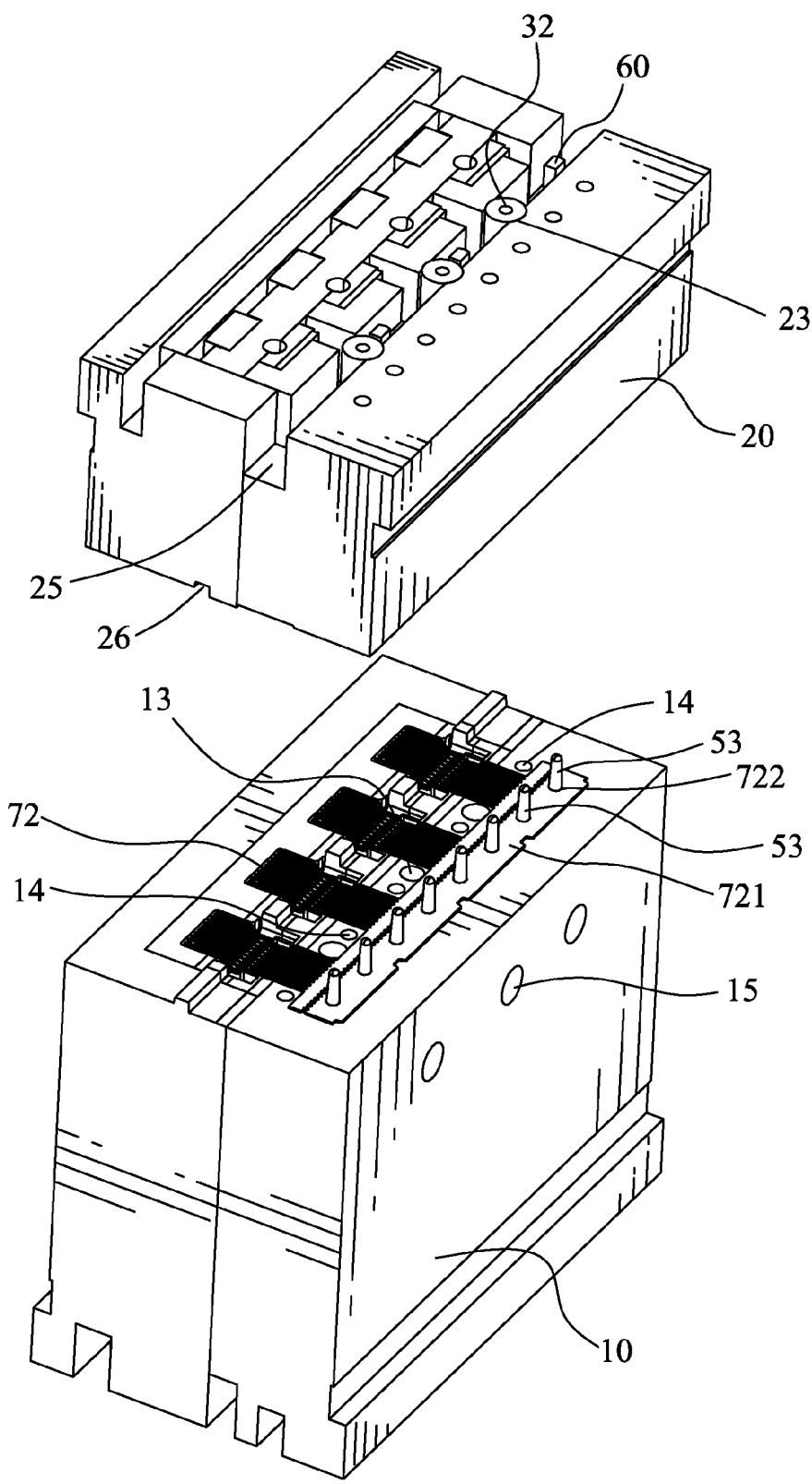
FIG. 3 is a perspective view of the injection mold of FIG. 1, wherein a female mold and a male mold of the injection mold are separated from each other and the second insert element is mounted in the male mold.

Referring to FIGS. 2-3, the male mold 10 is of a rectangular configuration. A top of the male mold 10 defines a male cavity 11 at a front thereof, a plurality of assembling holes 13 transversely arranged at regular intervals and located behind the male cavity 11, and a plurality of matching holes 14 interspersed in the intervals among the assembling holes 13. The male mold 10 defines a plurality of receiving holes 12 transversely arranged at regular intervals, and located behind the assembling holes 13 and the matching holes 14. Each of the receiving holes 12 extends vertically to penetrate through the male mold 10. A rear side of the male mold 10 defines a plurality of locating holes 15 transversely arranged at regular intervals, and each of the locating holes 15 is communicated with the corresponding assembling hole 13.

Referring to FIG. 1, FIG. 2, FIG. 4 and FIG. 6, the female mold 20 is of a rectangular configuration. A front of a bottom of the female mold 20 defines a female cavity 21. The female mold 20 defines a plurality of mating holes 24 transversely arranged at regular intervals, and each of the mating holes 24 extends vertically to penetrate through the female mold 20. A middle of a top of the female mold 20 is concaved downward to form a passage 25 transversely penetrating therethrough. A bottom wall of the passage 25 defines a plurality of holding holes 22 transversely arranged at regular intervals, and a plurality of fixing holes 23 interspersed in the intervals among the holding holes 22. The holding holes 22 and the fixing holes 23 are disposed between the female cavity 21 and the mating holes 24, and vertically penetrate through the female mold 20. The bottom of the female mold 20 defines a sprue channel 26.

Referring to FIG. 1, FIG. 2, FIG. 4 and FIG. 5, the fastening assembly 30 includes a fastening element 31 and a magnetic element 32. In this embodiment, the magnetic element 32 is a magnet. The fastening element 31 includes a cylindrical fastening portion 312 and a fastening pin 311 extended upward from a middle of a top surface of the fastening portion 312. An outer periphery of a lower portion of the fastening portion 312 is concaved inward to form a ring-shaped fastening groove 313 for buckling the locating element 40 therein. The magnetic element 32 is of a cylindrical shape with a center hole 321 being formed therein. The magnetic element 32 is held in the fixing hole 23. The fastening pin 311 can be inserted in the center hole 321 and attracted by the magnetic element 32 with the fastening portion 312 projecting under the bottom of the female mold 20.

Figure 4:
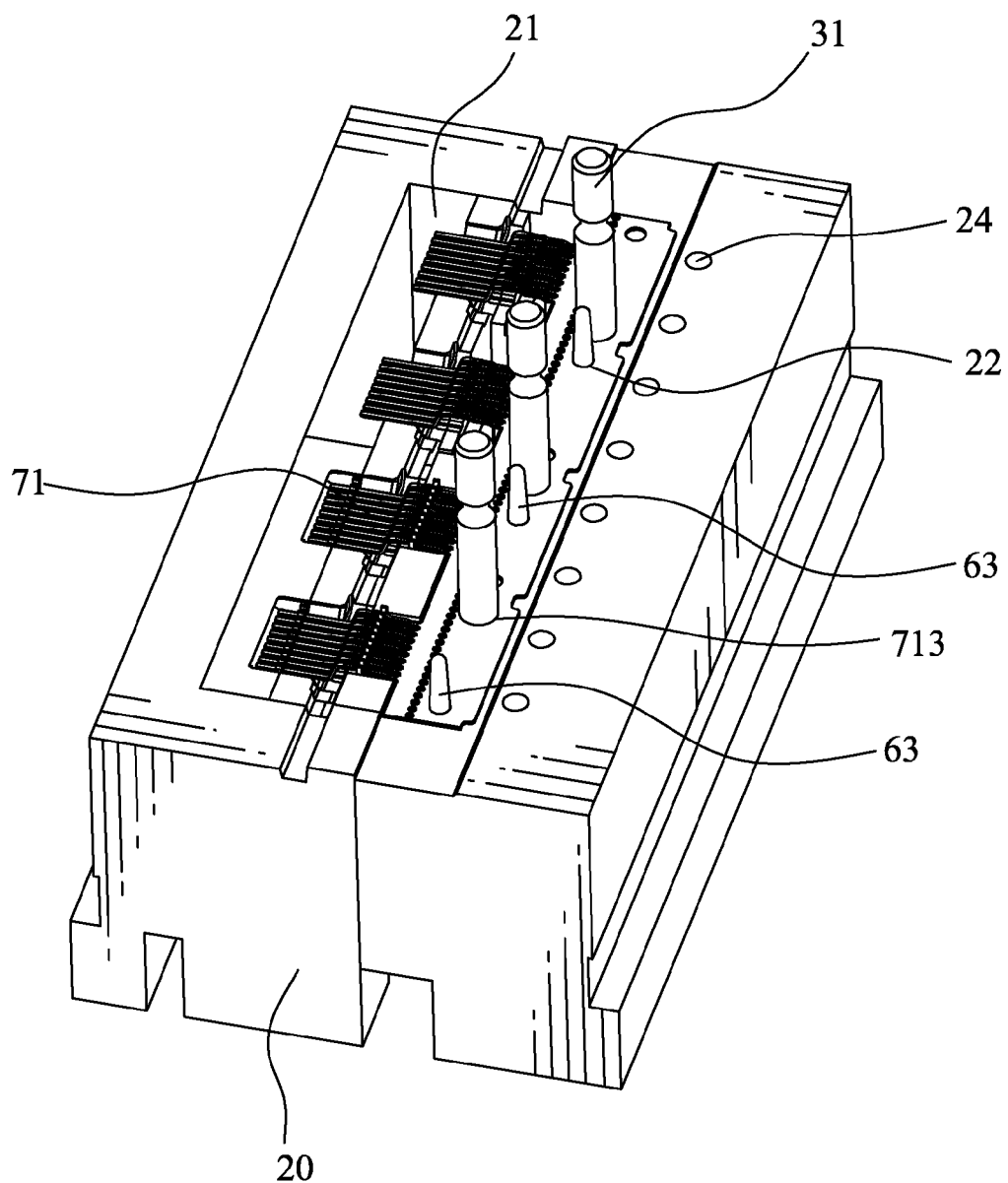
FIG. 4 is a perspective view of the female mold of the injection mold of FIG. 2, wherein the first insert element is mounted in the female mold.
Figure 5:
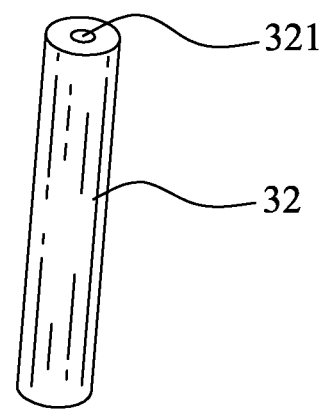
FIG. 5 is an exploded view of a fastening assembly of the injection mold of FIG. 2.
Figure 5:
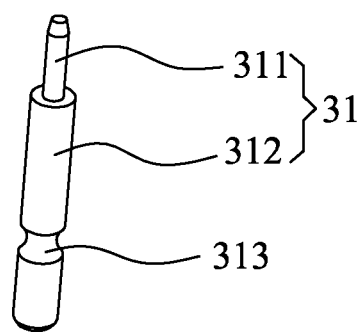
Figure 6:
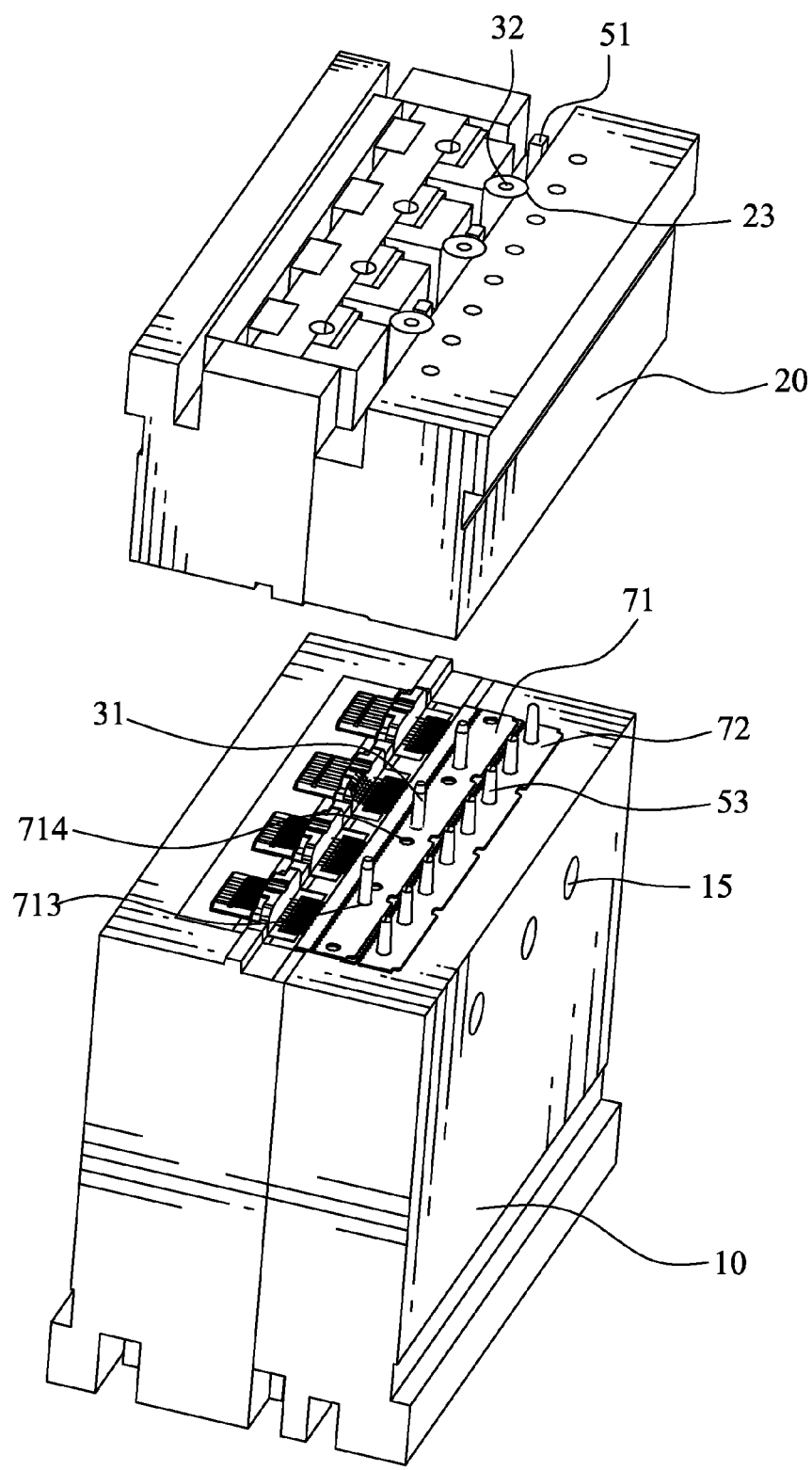
FIG. 6 is a perspective view of the injection mold of FIG. 2, wherein the female mold and the male mold of the injection mold are separated from each other and a product including the first insert element and the second insert element is mounted in the male mold after molding.

Referring to FIGS. 2-4, each of the first propping pillars 50 includes a first base portion 51 abutting against a bottom end of the receiving hole 12. A middle of a top of the first base portion 51 extends upward to form a first supporting portion 52 received in the receiving hole 12. A top of the first supporting portion 52 protrudes upward to form a tapered first insertion portion 53 projecting out of the receiving hole 12, and exposing beyond a top surface of the male mold 10. The second propping pillar 60 has a similar shape as that of the first propping pillar 50. The second propping pillar 60 includes a second base portion 61 abutting against a top end of the holding hole 22. A middle of a bottom of the second base portion 61 extends downward to form a second supporting portion 62 received in the holding hole 22. A bottom of the second supporting portion 62 protrudes downward to form a tapered second insertion portion 63 projecting out of the holding hole 22, and exposing beyond the bottom of the female mold 20.

Referring to FIG. 2, FIG. 3 and FIG. 4, the first insert element 71 includes a first material belt 711 with a plurality of fastening holes 713 and first through-holes 714 being formed therein, and a plurality of Z-shaped first conductive terminals 712 extending from a front side of the first material belt 711. The fastening holes 713 are corresponding to the center holes 321 and the first through-holes 714 are corresponding to the holding holes 22. The second insert element 72 includes a second material belt 721 with a plurality of second through-holes 722 being formed therein and a plurality of second conductive terminals 723 extending from a front side of the second material belt 721. The second through-holes 722 are corresponding to the receiving holes 12.

Referring to FIGS. 1-6, the second insert element 72 is mounted in the top of the male mold 10. The second conductive terminals 723 are located in the male cavity 11. The first insertion portions 53 of the first propping pillars 50 are inserted into the second through-holes 722 to locate the second insert element 72. As a result, the second insert element 72 can be accurately located in the male mold 10. The first insert element 71 is mounted in the bottom of the female mold 20. The first conductive terminals 712 are located in the female cavity 21. The second insertion portions 63 are inserted in the first through-holes 714 locate the first insert element 71. The fastening pins 311 pass through the fastening holes 713 to be inserted in the center holes 321 and attracted by the magnetic element 32 to locate the first insert element 71 between a bottom surface of the magnetic element 32 and the top surface of the fastening element 31 to prevent the first insert element 71 falling off from the female mold 20 when the female mold 20 is reversed or rotated. As a result, the first insert element 71 can be firmly located in the female mold 20.

Then the female mold 20 is engaged with the male mold 10. The first insertion portions 53 are inserted into the mating holes 24. The second insertion portions 63 and the fastening portions 312 are received in the matching holes 14 and the assembling holes 13, respectively. The locating elements 40 are driven into the locating holes 15 to slide in the fastening groove 313 to fasten the fastening portion 312 in the assembling holes 13. So, the female mold 20 are firmly mounted on the male mold 10 to define a chamber (not shown) therebetween, and locate the first insert element 71 and the second insert element 72 in the injection mold 100. Then thermoplastic resins are injected into the chamber of the injection mold 100 through the sprue channel 26, the thermoplastic resins and the first insert element 71 and the second insert element 72 are integrated and solidified for a predetermined time to become a product. At last, move the female mold 20 upward away from the male mold 10 to pull the magnetic element 32 to move upward. But, the fastening portions 312 are still remained in the assembling holes 13 on account of the locating elements 40 fastened in the fastening groove 313 to leave the product in the male cavity 11 so as to prevent the product being adhered to the female mold 20. Then take the product out of the male cavity 11, and cut down the first material belt 711 and the second material belt 721 of the first insert element 71 and the second insert element 72 by a fixture.

As described above, the fastening pins 311 pass through the fastening holes 713 to be inserted in the center holes 321 and attracted by the magnetic element 32 to prevent the first insert element 71 falling off from the female mold 20 when the female mold 20 is reversed or rotated. In a process of moving the female mold 20 upward away from the male mold 10 to pull the magnetic element 32 to move upward, the fastening portions 312 are still remained in the assembling holes 13 on account of the locating elements 40 fastened in the fastening groove 313 to leave the product in the male cavity 11 so as to prevent the product being adhered to the female mold 20.

What is claimed is:

1. An injection mold for molding a first insert element and a second insert element therein, the first insert element including a first material belt with at least one fastening hole formed therein, and a plurality of first conductive terminals extending from a side of the first material belt, the second insert element including a second material belt and a plurality of second conductive terminals extending from a side of the second material belt, the injection mold comprising:

a male mold, a top of the male mold defining a male cavity for receiving the second conductive terminals therein;

a female mold matched with the male mold, a bottom of the female mold defining a female cavity for receiving the first conductive terminals therein, the female mold defining at least one fixing hole vertically penetrating therethrough and located adjacent to the female cavity; and at least one fastening assembly includes a fastening element and a magnetic element with a center hole formed therein, the magnetic element held in the fixing hole, a top of the fastening element passing through the fastening hole to be inserted in the center hole and attracted by the magnetic element to locate the first insert element between the magnetic element and the fastening element.

2. The injection mold as claimed in claim 1, wherein the fastening element includes a fastening portion projecting under a bottom surface of the female mold, and a fastening pin protruded upward from a top surface of the fastening portion to pass through the fastening hole to be inserted in the center hole to locate the first insert element between a bottom surface of the magnetic element and the top surface of the fastening portion.

3. The injection mold as claimed in claim 2, wherein the magnetic element is a magnet.

4. The injection mold as claimed in claim 2, wherein the top of the male mold defines at least one assembling hole corresponding to the fixing hole, the fastening portion is inserted in the assembling hole.

5. The injection mold as claimed in claim 4, further comprising a locating element, a rear side of the male mold defining a locating hole communicated with the assembling hole, the locating element being driven to slide into the assembling hole through the locating hole, an outer periphery of a lower portion of the fastening portion is concaved inward to form a fastening groove for buckling with the locating element.

6. The injection mold as claimed in claim 5, wherein the fastening groove is ring-shaped, the locating element is a steel ball.

7. An injection mold for molding a first insert element, the first insert element including a first material belt with at least one fastening hole formed therein, and a plurality of first conductive terminals extending from a side of the first material belt, the injection mold comprising:
a male mold;
a female mold matched with the male mold to define a chamber therebetween for receiving the first conductive terminals therein, the female mold defining at least one fixing hole vertically penetrating therethrough and located adjacent to the chamber; and
at least one fastening assembly includes a fastening element and a magnetic element with a center hole formed therein, the magnetic element held in the fixing hole, a top of the fastening element passing through the fastening hole to be inserted in the center hole and attracted by the magnetic element to locate the first insert element between the magnetic element and the fastening element.

8. The injection mold as claimed in claim 7, wherein the fastening element includes a fastening portion projecting under a bottom surface of the female mold, and a fastening pin protruded upward from a top surface of the fastening portion to pass through the fastening hole to be inserted in the center hole to locate the first insert element between a bottom surface of the magnetic element and the top surface of the fastening portion.

9. The injection mold as claimed in claim 8, wherein the magnetic element is a magnet.

10. The injection mold as claimed in claim 8, wherein the top of the male mold defines at least one assembling hole corresponding to the fixing hole, the fastening portion is inserted in the assembling hole.

11. The injection mold as claimed in claim 10, further comprising a locating element, a rear side of the male mold defining a locating hole communicated with the assembling hole, the locating element being driven to slide into the assembling hole through the locating hole, an outer periphery of a lower portion of the fastening portion being concaved inward to form a fastening groove for buckling with the locating element.

12. The injection mold as claimed in claim 11, wherein the fastening groove is ring-shaped, the locating element is a steel ball.

* * * * *